United States Patent Office 3,378,570
Patented Apr. 16, 1968

3,378,570
17 - HYDROXY - 17α - OXA - D - HOMOANDROST-
4 - EN - 3 - ONE, Δ¹ AND 19 - NOR DERIVATIVES
CORRESPONDING, ETHERS THEREOF AND IN-
TERMEDIATES THERETO
John S. Baran, Morton Grove, Ill., assignor to G. D. Searle
& Co., Chicago, Ill., a corporation of Delaware
No Drawing. Filed July 20, 1964, Ser. No. 383,932
11 Claims. (Cl. 260—345.2)

ABSTRACT OF THE DISCLOSURE 17-hydroxy-17α-oxa-D-homoandrost-4-en-3-one, Δ¹ and 19-nor derivatives corresponding and ethers thereof useful as potent anti-estrogenic agents. The androstene derivatives are manufactured by reduction of the corresponding 17-oxo-17α-oxa compounds, in the case of the Δ⁴ compounds preferably after ketalization of the 3-keto group, followed by removal of the ketal function. The 19-nor compounds are manufactured by Birch reduction of the corresponding novel intermediate 17-oxygenated estra-1,3,5(10)-trienes which are obtained by reduction of 3-methoxy-17α-oxa-D-homoestra-1,3,5(10)-trien-17 - one. The instant ethers are produced by etherification of the corresponding lactols.

---

The present invention is concerned with steroidal D-homo-lactols and, more particularly, with the lactols and corresponding ethers of the following structural formula

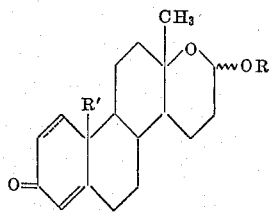

wherein R is hydrogen or a lower alkyl radical, R' is hydrogen or a methyl radical, and the dotted line indicates the optional presence of a 1,2-double bond. The wavy line indicates that the instant compounds contain both the 17α- and 17β-epimers, the ratio being approximately 95% α to 5% β.

The lower alkyl radicals represented by R are typified by methyl, ethyl, propyl, butyl, pentyl, hexyl, and the branched-chain isomers thereof.

Starting materials suitable for the manufacture of the instant compounds of the androstane series are those of the structural formula

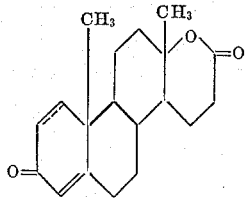

wherein the dotted line indicates the optional presence of a 1,2-double bond. 17α-oxa-D-homoandrost-4-ene-3,17-dione, for example, is converted to the corresponding 3-ethylene ketal by reaction with ethylene glycol in the presence of p-toluenesulfonic acid, and that ketal is reduced with diisobutyl aluminum hydride to afford the lactol, 17-hydroxy-17α-oxa-D-homoandrost-5-en-3-one 3-ethylene ketal. Cleavage of the ketal function with aqueous hydrochloric acid in methanol affords 17-methoxy-17α-oxa-D-homoandrost-4-en-3-one. Conversion of that lactol ether to the lactol, 17-hydroxy-17α-oxa-D-homoandrost-4-en-3-one, is effected by heating with dilute hydrochloric acid in aqueous tetrahydrofuran. The corresponding 1-dehydro substance, i.e., 17-hydroxy-17α-oxa-D-homoandrosta-1,4-dien-3-one, is produced by reduction, typically with diisobutyl aluminum hydride, of 17α-oxa-D-homoandrosta-1,4-dien-3,17-dione.

An alternate method for production of the instant 1,4-bisdehydro derivatives involves dehydrogenation of the corresponding 4-dehydro compounds. A convenient procedure utilizes microorganisms capable of dehydrogenating the 1,2-position of steroids. A specific example is the dehydrogenation of 17-methoxy-17α-oxa-D-homoandrost-4-en-3-one by incubation with *Arthrobacter sp.* ATCC 15186 to yield 17-methoxy-17α-oxa-D-homoandrosta-1,4-dien-3-one. Cleavage of the latter ether by the aforementioned process of heating with dilute hydrochloric acid in aqueous tetrahydrofuran results in 17-hydroxy-17α-oxa-D-homoandrosta-1,4-dien-3-one.

Production of the instant derivatives of the estrene series proceeds through novel intermediates of the structural formula

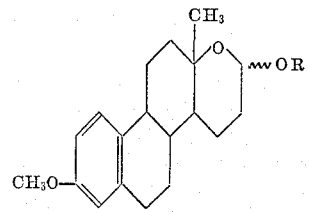

wherein R is hydrogen or a lower alkyl radical. The starting materials suitable for manufacture of those intermediates is 3-methoxy-17α - oxa - D - homoestra - 1,3,5(10)-trien-17-one. Reduction of the latter substance, for example with diisobutyl aluminum hydride, affords 3-methoxy-17α-oxa-D-homoestra-1,3,5(10)-trien-17 - ol. Conversion to the corresponding 17-alkyl ethers is effected by reaction with a lower alkanol in the presence of an acidic catalyst. Utilization of methanol in that reaction results in the 17-methyl ether. Birch reduction of that 17-methyl ether, i.e., reaction with sodium in liquid ammonia, affords 17-hydroxy-17α-oxa-D-homoestr-4-en - 3 - one. The etherification of the latter lactol by reaction with a lower alkanol in the presence of an acid catalyst affords the 17-(lower alkyl)ethers. Reaction of 17-hydroxy-17α-oxa-D-homoestr-4-en-3-one, for example, with methanol in the presence of p-toluenesulfonic acid yields 17-methoxy-17α-oxa-D-homoestr-4-en-3-one.

The 4-dehydro and 1,4-bisdehydro compounds of the present invention display valuable pharmacological properties. They are, for example, anti-hormonal agents as is evidenced by their potent anti-estrogenic activity.

The invention will be further illustrated by the following examples which are to be construed as illustrative only and not limiting the invention either in spirit or in scope. It will be apparent to those skilled in the art of organic synthesis that many modifications both of materials and methods may be practiced without departing from this invention. In these examples, quantities of materials are given in parts by weight and temperatures in degrees centigrade (0 C.).

Example 1

A mixture of 3 parts of 17α-oxa-D-homoandrost-4-ene-3,17-dione, 0.25 part of p-toluenesulfonic acid, 11 parts of ethylene glycol, and 720 parts of benzene is stirred and slowly distilled over a period of about 6 hours, during which time approximately 360 parts of fresh benzene is added. The reaction mixture is then cooled, washed successively with aqueous sodium bicarbonate and water, dried over anhydrous magnesium sulfate, and evaporated to dryness under reduced pressure. The resulting crystalline residue of 17α-oxa-D-homoandrost-5-ene-3,17-dione 3-ethylene ketal melts at 230–235°. Further purification by recrystallization from methanol-methylene chloride affords a pure sample, melting at about 235–238°, exhibiting an optical rotation of —102° in chloroform, and displaying infrared absorption maxima in chloroform at about 3.39, 5.83, 7.71, and 9.04 microns and also nuclear magnetic resonance maxima at 60, 80, 239, 322.5, and 326 cycles per second.

Example 2

A solution of 3.5 parts of 17α-oxa-D-homoandrost-5-ene-3,17-dione 3-ethylene ketal in 400 parts of toluene is distilled until about 45 parts of toluene are collected. The resulting solution is then cooled to approximately —70°, and 24 parts by volume of a 1.5 molar diisobutyl aluminum hydride in toluene solution is added. Stirring at about —60° is continued for approximately 30 minutes, after which time the reaction mixture is poured into 100 parts of water containing 105 parts of acetic acid and 100 parts of ice. The resulting aqueous mixture is stirred vigorously for about 5 minutes, and the organic layer is separated, washed successively with water and aqueous sodium bicarbonate, dried over anhydrous magnesium sulfate and concentrated to dryness at reduced pressure. Trituration of the crystalline residue with benzene affords 17-hydroxy-17α-oxa-D-homoandrost-5-en-3-one 3-ethylene ketal, melting at about 202–208°. Recrystallization from methylene chloride-acetone affords a pure sample, melting at about 202–205° and exhibiting an optical rotation of +7° in chloroform. Infrared absorption maxima in chloroform are observed at about 2.76, 2.96, 3.39, and 7.23 microns, and nuclear magnetic resonance peaks appear at 60, 72, 237, and 321 cycles per second.

Example 3

To a slurry of 4.75 parts of 17-hydroxy-17α-oxa-D-homoandrost-5-en-3-one 3-ethylene ketal with 240 parts of methanol containing 30 parts of water, in a nitrogen atmosphere, is added 150 parts of water containing 6 parts by volume of 4 N hydrochloric acid. The resulting reaction mixture is slowly distilled over a period of about 45 minutes, and the resulting solution is concentrated under reduced pressure in order to remove a portion of the organic solvent. The crystals which separate during this concentration are collected by filtration, washed on the filter with water, and dried under reduced pressure to afford 17-methoxy-17α-oxa-D-homoandrost-4-en-3-one. Recrystallization from methanol affords a pure sample, melting at about 149–152°, exhibiting an optical rotation of +138.5° in chloroform, and displaying nuclear magnetic resonance peaks at 70, 73, 207, 277, and 343 cycles per second. This substance can be represented by the following structural formula

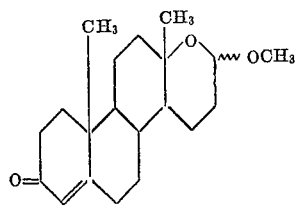

Example 4

A solution of one part of 17-methoxy-17α-oxa-D-homoandrost-4-en-3-one in 135 parts of tetrahydrofuran containing 120 parts by volume of 0.8 N hydrochloric acid is concentrated by slow distillation over a period of about 20 minutes. Approximately 90 parts of fresh tetrahydrofuran is added to clarify the solution, and distillation is continued to remove the organic solvent. The crystalline material which precipitates during the concentration is collected by filtration, washed on the filter with water and dried under reduced pressure. Purification of this crude material is effected by chromatography on silica gel. Elution of the column with 5% ethyl acetate in benzene followed by recrystallization of the fraction obtained from that eluate results in 17α-oxa-D-homoandrosta-4,16-dien-3-one, melting at about 137–138°.

The 35–50% ethyl acetate in benzene eluates are combined, concentrated to dryness, and the resulting residue is triturated with ether to yield 17-hydroxy-17α-oxa-D-homoandrost-4-en-3-one, melting at about 168–175°. Recrystallization from acetone-hexane affords a pure sample melting at about 171–173°. Nuclear magnetic resonance maxima are observed at about 70, 73, 230, 305, and 344 cycles per second. This compound can be represented by the following structural formula

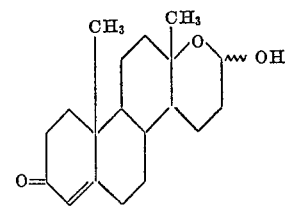

Example 5

A solution of 5 parts of 17α-oxa-D-homoandrosta-1,4-diene-3,17-dione in 415 parts of toluene is distilled until anhydrous, then is cooled to about —60° by means of a Dry Ice-isopropyl alcohol bath. To that solution is then added, with stirring, 30 parts by volume of a 1.1 molar diisobutyl aluminum hydride in toluene solution, dropwise over a period of about 5 minutes. Stirring of the light yellow solution at about —60° continues for an additional 40 minutes, after which time the reaction mixture is diluted with approximately 8 parts of methanol. After allowing that solution to warm to approximately 0°, about 300 parts by volume of saturated aqueous sodium potassium tartrate is added and the organic layer is separated. That layer is washed successively with saturated aqueous sodium potassium tartrate and water, then is dried over anhydrous magnesium sulfate and distilled to dryness under reduced pressure. The residual glass-like material is purified by chromatography on silica gel. Elution of the chromatographic column with 5% ethyl acetate in benzene affords 4-methyl-17α-oxa-D-homoestra-1,3,5(10)-trien-17-ol, characterized by an optical rotation of +119° in chloroform.

Elution of the column with 25% ethyl acetate in benzene affords a fraction which is triturated with ether to afford 17 - hydroxy - 17α - oxa - D - homoandrosta - 1,4-diene-3-one. Further purification by recrystallization from acetone-hexane affords material melting at about 158–161°. It exhibits an optical rotation of 0° in chloroform. Nuclear magnetic resonance peaks, in deuterochloroform, are observed at 68, 71, 301, 363, 377, 423, and 428 cycles per second. This compound is represented by the following structural formula

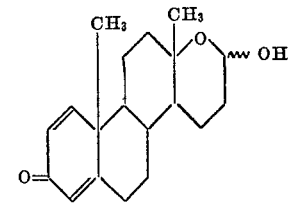

Example 6

To a solution of 5 parts of 3-methoxy-17α-oxa-D-homoestra-1,3,5(10)-trien-17-one in 360 parts of dry toluene, at about —70° with stirring, is added 25 parts by volume of a 1.2 N diisobutyl aluminum hydride in toluene solution over a period of about 2 minutes. Stirring at about —60° is continued for approximately one hour, after which time the reaction mixture is poured slowly with stirring into a mixture of 120 parts of ice, 126 parts of acetic acid and 200 parts of water. The resulting mixture is stirred for about 30 minutes, and the organic layer is separated and diluted with chloroform. That organic solution is then washed successively with water and aqueous sodium bicarbonate, dried over anhydrous magnesium sulfate and concentrated to dryness under reduced pressure. Trituration of the resulting crystalline residue with ether affords crude 3-methoxy-17α-oxa-D-homoestra-1,3,5(10)-trien-17-ol, melting at about 160–165°. Two recrystallizations from acetone afford a sample of the pure material, melting at about 178–184°. It exhibits nuclear magnetic resonance peaks at about 73, 226, 233, 240, and 307 cycles per second and is further characterized by the following structural formula

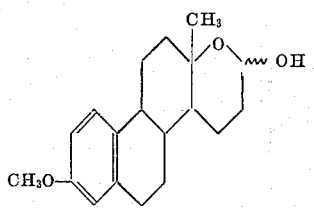

Example 7

A mixture of 2.75 parts of 3-methoxy-17α-oxa-D-homoestra-1,3,5(10)-trien-17-ol, 80 parts of methanol, and 0.1 part of p-toluenesulfonic acid is stirred for approximately one hour, then is partially concentrated. The product which separates is collected by filtration, washed on the filter with cold methanol, and dried to afford 17α-oxa - D - homoestra - 1,3,5(10) - triene - 3,17 - diol 3,17-dimethyl ether, melting at about 112–116°. Further purification is effected by recrystallization from methanol to afford a pure sample, melting at about 122–123°. Nuclear magnetic resonance peaks are observed at about 72, 208.5, 227, and 280.5 cycles per second. This compound is illustrated by the following structural formula

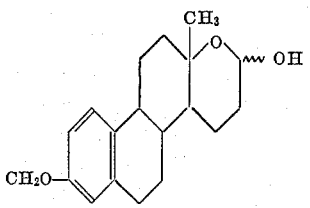

Example 8

To a mixture of 105 parts of liquid ammonia, 8 parts of tertiary-butyl alcohol, and 90 parts of tetrahydrofuran is added a solution of 2.4 parts of 17α-oxa-D-homoestra-1,3,5(10)-triene-3,17-diol 3,17-dimethyl ether in 22 parts of tetrahydrofuran. Approximately one part of metallic sodium is then added, and the blue reaction mixture is allowed to stand for about one hour, then is quenched with methanol until the color is dissipated. That mixture is then distilled to dryness under reduced pressure, and the resulting residue is dissolved in approximately 80 parts of methanol. That solution is then acidified by the addition of 25 parts by volume of 4 N hydrochloric acid, and the resulting acidic solution is concentrated by distillation at reduced pressure in order to remove most of the organic solvent. The residual aqueous mixture is extracted with methylene chloride, and the organic layer is separated, washed with aqueous sodium bicarbonate, dried over anhydrous magnesium sulfate and distilled to dryness under reduced pressure. That residue containing 17-methoxy-17α-oxa-D-homoestr-4-en-3-one is dissolved in approximately 200 parts by volume of 3:1 aqueous tetrahydrofuran containing one part by volume of 4 N hydrochloric acid, and the resulting solution is distilled slowly over a period of about one hour. The remaining aqueous mixture is concentrated at room temperature, and the semi-crystalline aqueous mixture remaining is extracted with benzene. The benzene solution is washed with aqueous sodium bicarbonate, dried over anhydrous magnesium sulfate, and distilled to dryness under reduced pressure. Further purification of that crude product is effected by chromatography on silica gel. Elution of the column with 5% ethyl acetate in benzene affords 17α-oxa-D-homoestra-4,16-dien-3-one, melting at about 130°.

Further elution of the column with 45–60% ethyl acetate in benzene affords a fraction which is recrystallized twice from acetone-hexane to yield pure 17-hydroxy-17α-oxo-D-homoestr-4-en-3-one, melting at about 143–144°. This substance is characterized further by the following structural formula

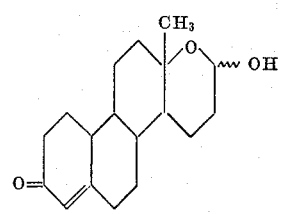

Example 9

A mixture of 10 parts of 17-hydroxy-17α-oxa-D-homoestr-4-en-3-one, 0.1 part of p-toluenesulfonic acid and 8 parts of methanol is stored at room temperature for about one hour then is poured carefully into 5% aqueous sodium bicarbonate. The mixture is diluted with methanol to achieve solution, and that solution is concentrated by means of a stream of nitrogen to remove the organic solvent. The crystals which separate are collected by filtration, washed with water, and dried to afford pure 17-methoxy-17α-oxa-D-homoestr-4-en-3-one, melting at about 111–113° and characterized further by the following structural formula

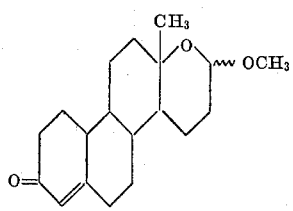

Example 10

By substituting an equivalent quantity of ethanol and otherwise proceeding according to the processes described in Example 9, 17-ethoxy-17α-oxa-D-homoestr-4-en-3-one is obtained.

Example 11

The substitution of an equivalent quantity of ethanol in the procedure of Example 3 results in 17-ethoxy-17α-oxa-D-homoandrost-4-en-3-one.

Example 12

A liquid nutrient medium containing 8 parts of a pancreatic digest of casein, 1000 parts of distilled water, and a culture of *Arthrobacter* sp. ATCC 15186 is kept at 25–28° for about 30 hours with continuous agitation. To that culture is then added a solution of 25 parts of 17-methoxy-17α-oxa-D-homoandrost-4-en-3-one in 1000 parts by volume of a solvent mixture containing equal parts of methanol and acetone. Incubation is continued for about 48 hours, at the end of which time the mixture is extracted with methylene chloride. Evaporation to dryness of the organic extract affords 17-methoxy-17α-oxa-D-homoandrosta-1,4-dien-3-one, melting at about 146–148° and displaying infrared absorption peaks at about 3.39, 6.01, 6.16, and 6.22 microns. It is further characterized by the following structural formula

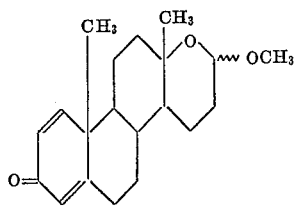

Example 13

The substitution of an equivalent quantity of 17-methoxy - 17α - oxa-D-homoandrosta-1,4-dien-3-one in the processes of Example 4 results in 17-hydroxy-17α-oxa-D-homoandrosta-1,4-dien-3-one, identical with the product of Example 5.

What is claimed is:
1. A compound of the formula

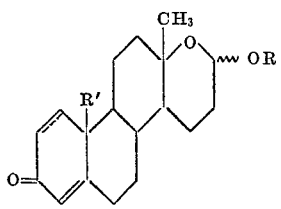

wherein R is selected from the group consisting of hydrogen and a lower alkyl radical, R' is a member of the class consisting of hydrogen and a methyl radical, and the dotted line indicates the optional presence of a 1,2-double bond.

2. A compound of the formula

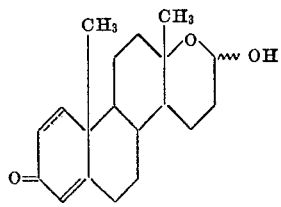

wherein the dotted line indicates the optional presence of a 1,2-double bond.

3. 17-hydroxy - 17α - oxa-D-homoandrosta-1,4-dien-3-one.
4. 17-hydroxy-17α-oxa-D-homoestr-4-en-3-one.
5. 17-methoxy-17α-oxa-D-homoandrost-4-en-3-one.
6. 17-methoxy - 17α - oxa-D-homoandrosta-1,4-dien-3-one.
7. 17-methoxy-17α-oxa-D-homoestr-4-en-3-one.
8. A compound of the formula

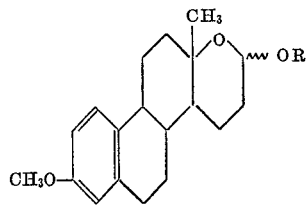

wherein R is selected from the group consisting of hydrogen and a lower alkyl radical.
9. 3-methoxy - 17α - oxa-D-homoestra-1,3,5(10)-trien-17-ol.
10. 17α-oxa-D-homoestra - 1,3,5(10) - triene-3,17-diol-3,17-dimethyl ether.
11. 17-hydroxy-17α-oxa-D-homoandrost-4-en-3-one.

References Cited

UNITED STATES PATENTS 3,064,011    11/1962    Knox _____ 260—345.2
3,128,285    4/1964     Atwater _____ 260—345.2

OTHER REFERENCES

El-Tayeb et al., Chemical Abstracts, vol. 62, col. 847d (1965).

Edgren et al., Proc. Soc. Exp. Biol. and Med., vol. 94 (1957), pp. 537–9.

Edgren, Proc. Soc. Exp. Biol. and Med., vol. 92 (1956), pp. 569–71.

JOHN D. RANDOLPH, *Primary Examiner.*

WALTER A. MODANCE, *Examiner.*

JOHN M. FORD, *Assistant Examiner.*

UNITED STATES PATENT OFFICE
CERTIFICATE OF CORRECTION

Patent No. 3,378,570                      April 16, 1968

John S. Baran

It is certified that error appears in the above identified patent and that said Letters Patent are hereby corrected as shown below:

Column 5, lines 41 to 49, the formula should appear as shown below:

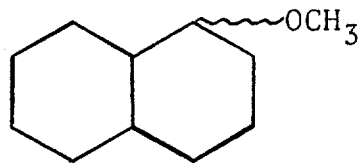

Signed and sealed this 3rd day of February 1970.

(SEAL)
Attest:

EDWARD M. FLETCHER, JR.               WILLIAM E. SCHUYLER, JR.
Attesting Officer                          Commissioner of Patents